United States Patent [19]

Salisbury et al.

[11] 4,379,100
[45] Apr. 5, 1983

[54] POLYURETHANE MOLDING PROCESS WITH SILOXANE INTERNAL RELEASE AGENT

[75] Inventors: Wayne C. Salisbury, Middleton; Lee Hodson, Barrington, both of N.H.

[73] Assignee: Ex-Cell-O Corporation, Troy, Mich.

[21] Appl. No.: 246,103

[22] Filed: Mar. 20, 1981

Related U.S. Application Data

[63] Continuation-in-part of Ser. No. 230,896, Feb. 2, 1981, abandoned.

[51] Int. Cl.³ .......................... B28B 7/36; B28B 7/38
[52] U.S. Cl. ..................................... 264/39; 264/338; 521/110
[58] Field of Search .................. 264/39, 300, 338; 521/110; 528/48, 49, 55, 58

[56] References Cited

U.S. PATENT DOCUMENTS

| | | | |
|---|---|---|---|
| 4,033,912 | 7/1977 | Kleimann et al. | 264/300 |
| 4,048,105 | 9/1977 | Salisbury | 521/128 |
| 4,076,695 | 2/1978 | Keil | 528/48 |
| 4,102,833 | 7/1978 | Salisbury | 521/110 |
| 4,111,861 | 9/1978 | Godlewski | 264/300 |
| 4,130,698 | 12/1978 | Sparrow et al. | 264/300 |
| 4,220,727 | 9/1980 | Godlewski | 521/110 |
| 4,254,228 | 3/1981 | Kleimann et al. | 264/300 |

*Primary Examiner*—Donald E. Czaja
*Assistant Examiner*—W. Thompson
*Attorney, Agent, or Firm*—Lee A. Strimbeck

[57] ABSTRACT

An improved polyurethane RIM process using a polycarboxy-functional alkyl siloxane as an internal release agent characterized by:
(1) Tool break-in or preconditioning with siloxane treatment of the surfaces;
(2) Supplying the siloxane to the mix head as a third stream when necessary to prevent undesired side reactions;
(3) Using a minimal amount of siloxane that is inadequate for mold release in the absence of the tool preconditioning;
(4) Adjustment of catalyst package to counter the inhibiting effects of the siloxane.

The use of a bare minimal amount of siloxane prevents excess siloxane from appearing in the surface of the article and causing subsequent paint wet-out and like difficulties. The third stream isolating of the siloxane prevents its carboxy-functional groups from reacting with the prepolymer or with other ingredients that may be carried in the polyol blend.

10 Claims, 1 Drawing Figure

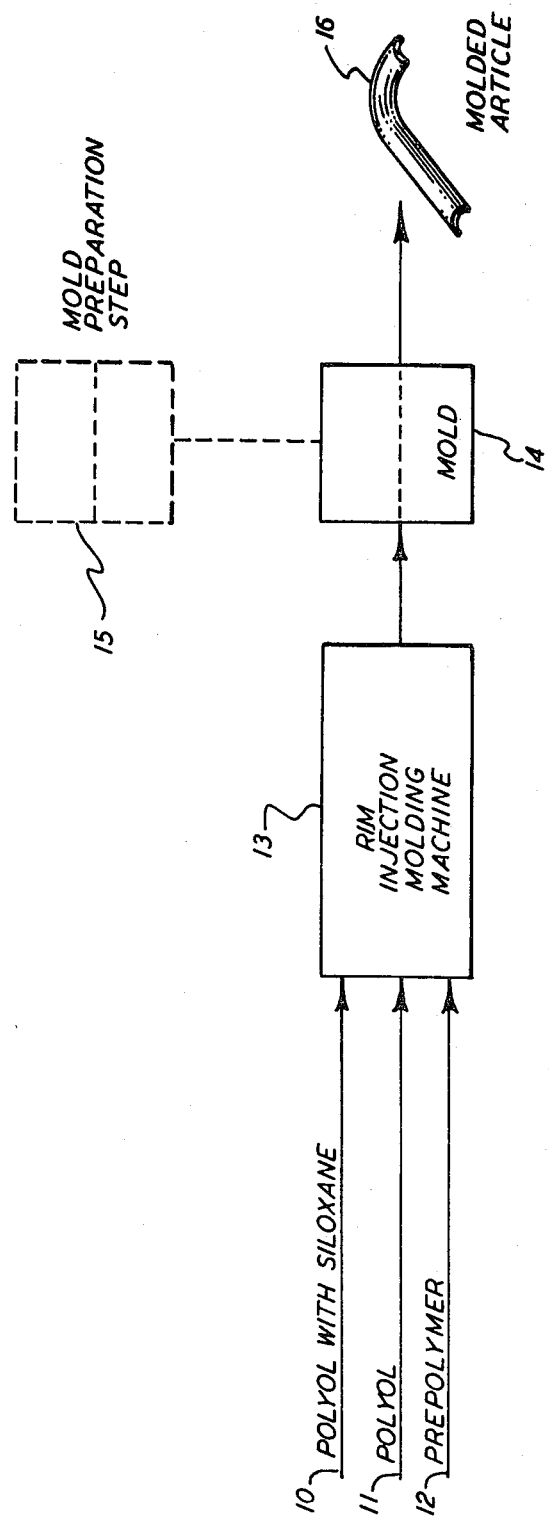

POLYURETHANE MOLDING PROCESS WITH SILOXANE INTERNAL RELEASE AGENT

RELATED APPLICATION

This application is a continuation-in-part of Ser. No. 230,896, filed Feb. 2, 1981 by the same inventors and having the same title, now abandoned.

PRIOR ART

U.S. Pat. No. 4,048,105—Salisbury—Sept. 13, 1977
U.S. Pat. No. 4,076,695—Keil—Feb. 28, 1978
U.S. Pat. No. 4,102,833—Salisbury—July 25, 1978
U.S. Pat. No. 4,111,861—Godlewski—Sept. 5, 1978

INTRODUCTION

This invention is a process of molding polyurethanes using a polycarboxy-functional siloxane as an internal release agent. More specifically, it is concerned with an improved polyurethane reaction injection molding (hereinafter "RIM") process wherein a tricarboxy-functional alkyl siloxane internal release agent is used in a critically minimal amount in conjunction with an optimization of the urethane catalyst package and a specific mold preparation or seasoning procedure.

In this improved RIM process, the siloxane release agent may desirably be introduced to the mix head as a third stream separate from the catalyst-containing polyol stream and the isocyanate stream because each of these streams often contains ingredients unduly reactive with the carboxy-functional siloxane.

Polyurethane RIM processes are capable of very fast cycle times. It is necessary that the molded article release from the mold cavity quickly and well. Externally applied release agents have been used on the mold cavity surfaces but, as is well known, their use suffers from such problems as the need to apply the release agent each cycle, non-uniformity of application, build-up and fouling of the mold and contamination of the surface of the molded article making subsequent finishing of the surface difficult. Also, loss of surface smoothness, sheen or gloss is quite apparent. The surfaces of such molded urethane articles usually have a matte appearance because of the mold release agents applied to the mold surfaces.

For these reasons, the art has turned to the use of internal release agents which are mixed with the polyurethane ingredients and thus are present during each molding cycle. The release agents appear at the interface between the mold cavity wall and the reacting ingredients and effect sufficient non-adherence between the two so that release and ejection of the molded article can be accomplished. The above-referred to U.S. Pat. Nos. 4,076,695 and 4,111,861, disclose the use of internal release agents and their disclosures are incorporated by reference. This invention is a specific improvement over the process disclosed in U.S. Pat. No. 4,076,695. In the process of this patent, there is a critical balance, difficult to achieve as a practical matter, between having present sufficient of the siloxane mold release agent to effect satisfactory release repetitiously, cycle after cycle, without mold fouling, and having too much present such that the release agent appears on the surface of the molded article and interferes with subsequent painting of the molded article, e.g., causing poor wetting out and fisheying of the paint, or poor adherence of the paint film. Also, the siloxane greatly inhibits the cure of the urethane and this must be compensated for.

The present invention is specifically directed to the polyurethane RIM processes disclosed in U.S. Pat. Nos. 4,048,205 and 4,102,833, by one of the present inventors, using the compositions set out in these patents, the disclosures of which are incorporated by reference.

The present invention is a process wherein the ingredients for a polyurethane composition are brought together and reacted in a mold cavity to form a molded article which ingredients include a normally liquid carboxy-functional siloxane internal mold release agent (hereinafter, "CFS").

The improvement of this invention comprises dividing the reaction ingredients into at least two components, viz.:

(a) an isocyanate-containing component free of CFS,
(b) a polyol-containing component containing the CFS and free of material that will so react with the CFS as to cause, inter alia, objectional gelling.

The polyol stream contains an amount of curing agent and catalyst sufficient to overcome the inhibiting effects of the CFS (which amount would make the system inoperable in the absence of the CFS).

When curing agents and catalysts are used that are unduly reactive with the CFS in a polyol blend, then a three stream system is used. In addition to the isocyanate stream, the polyol stream is divided into two parts: one which contains the catalyst and curing agent and is free of CFS and another which contains the CFS and is free of ingredients that would react undesirably with the CFS.

It has been the experience of the inventors that with certain polyols extenders and/or catalyst packages that objectional gelling may occur in the polyol stream containing them and the CFS. Examination of such gels has established that the CFS is part of the gel structure. Generally speaking, if a 1000 c.c. sample of a polyol stream containing CFS and the other desired ingredients will not show objectional gelling after being held for 24 hours at 100° F. under nitrogen with agitation, then it is probably safe to use a two stream system. Otherwise, a three stream feed system should be preferred.

The internal surfaces of the mold cavity containing the reacting ingredient are preconditioned by uniformly and thinly applying the CFS thereto and seasoning the surfaces by repeating several molding cycles with intermittent reapplication of the CFS as required, following which at least one hundred molding cycles can be effected with good release and without further application of the CFS to the surfaces. The amount of CFS in the reactive ingredients is kept to a minimal amount, less than 0.5 weight percent, and preferably less than 0.3 weight percent, which is just sufficient to effect adequate release with the mold properly preconditioned but is inadequate in the absence of the preconditioning of the mold.

The urethane catalyst package of an amine and an organic heavy metal compound is optimized to overcome the inhibiting effects of the CFS by approximately doubling the amount of amine normally used and approximately quadrupling the amount of the heavy metal compound. In some instances, an amine will not be used. The amount of amine, if used, is usually greater than 2.5 parts by weight and the amount of organometal compound is greater than 0.1 parts by weight. In the absence of the CFS this amount of catalyst would make the system so reactive as to severely limit processability.

In the preconditioning of the mold, the procedure used is to thoroughly clean the internal mold surfaces as by polishing with a mild abrasive-containing compound, e.g. jeweler's rouge, followed by application of a solution of the CFS and thorough buffing to remove all excess CFS. Thereafter as many molding cycles as possible are carried out until some sticking is observed or the effort necessary to effect mold opening substantially increases. The cleaning, CFS application and buffing steps are then repeated. Eventually, usually within 2 to 10 cleaning/buffing cycles, "equilibrium" is achieved where no further external application of CFS to the internal mold surface is required such that with the maintenance of the proper minimal amount of the CFS in the reacting ingredients, repetitious mold opening and quick release of the molded article can be accomplished without difficulty. This mold break in procedure has been successfully applied to molds made of aluminum, nickel and aluminum oxide.

While this is a fairly extensive tool break in procedure, it is well worth the effort inasmuch as it eliminates subsequent problems in painting or otherwise finishing the molded surface of the article and substantially reduces rejects. Another unexpected advantage found during the course of the research work leading to this invention was that the surface finish, i.e. sheen, gloss, reflectivity, of the article as molded in much improved as compared to molded urethane articles where the mold release is applied directly to the mold surface, so much so that the molded product can be considered to be unique. The Distinctness of Image (DOI) of the as-molded surface of the product of this invention is at least eight units and is usually fifteen units higher than the same product made and demolded in the conventional manner. For a description of the DOI reflectometer and test see General Motors Engineering Standard GM 9101P, "Test for Evaluating Paint Film Distinction of Image".

An interesting phenomenon of this improved procedure is that it appears that better release is obtained the faster the reaction rate of the polyurethane composition. The reason for this is not known. However, it is possible that the faster reaction times allow for less wetting of and thus adherence to the mold surface. It is preferred to use total shot times from the time the ingredients are brought together in the mixing head until they are injected in the mold cavity of less than 3 seconds and to have reaction times to mold openings of less than 60 seconds, usually less than 40 seconds.

The following table gives the proportions of the ingredients that can be used to prepare the urethane. These ingredients are known as are the amounts to be used except that the amount of the internal release additive required is less and the amount of catalyst is greater. This table also gives three examples of the invention.

| | Broad Range | Preferred Range | Examples I | II | III |
|---|---|---|---|---|---|
| Poly A | | | | | |
| Long Chain Polyol #1[(1)] | 20-50 | 30-40 | 39.50 | 0 | 29.66 |
| Long Chain Polyol #2[(1)] | 20-50 | 30-40 | 0 | 80 | 0 |
| Polymeric Diol[(2)] Short Chain | 1-10 | 2-7 | 2.00 | 0 | 0 |
| Alkane Diol #1[(3)] Short Chain | 10-30 | 15-25 | 18.13 | 0 | 0 |
| Alkane Diol #2[(3)] | 0.5-30 | 0.8-1.0 | 0.93 | 20 | 0 |
| Aromatic Polyamine #1[(4)] | 3-20 | 3-5 | 3.50 | 0 | 0 |
| Aromatic Polyamino #2[(4)] | 3-30 | 10-25 | 0 | 0 | 18.80 |
| Catalyst #1[(5)] | 2-6 | 3-5 | 3.00 | 0 | 0.60 |
| Catalyst #2[(5)] | 0.1-0.6 | 0.2-0.5 | 0.20 | 0.40 | 0.10 |
| Internal Release Agent[(6)] | 0.1-2.00 | 0.2-1.00 | 0 | 0.43 | 0 |
| Poly B | | | | | |
| Long Chain Polyol #1[(1)] | 25-60 | 28-50 | 38.00 | 0 | 50 |
| Internal Release Agent[(6)] | 0.1-2.00 | 0.2-1.00 | 0.46 | 0 | 0.36 |
| Isocyanate | | | | | |
| MDI prepolymer[(7)] to Index of | 98-110 | 100-105 | 100 | 100 | 105 |

NOTES TO TABLE:
[(1)]A polyol having a molecular weight in the range of 3000-6000, a functionality of 2 to 3 and an equivlent weight of 1500-3000 such as a polyetherdiol/triol polymer. Examples include Wyandotte's P-380, P-581, Carbide's 3128, 3428, 0440; Jeffersons SF 5505
Example I: E9207 supplied by Mobay
Example II: D440 supplied by Union Carbide
[(2)]A polymer diol having a molecular weight of 500 to 2500. Polymeg 1000 supplied by Quaker Oats is used in these examples.
[(3)]These alkane diols preferably having molecular weights of 60-250. They are used as chain extenders. Example I uses butane diol and Example II uses ethylene glycol.
[(4)]Aromatic polyamine chain extenders/crosslinker such as methylene dianaline, toluene diamine, and phenylene diamine.
Example I: Curithane 103, (4,4'methylene dianiline) supplied by Upjohn.
Example II: Baytec 505 supplied by Mobay.
[(5)]Amine and organometallic catalysts such as triethylenediame, N-ethyl-morpholine, dibutyl tin diacetate and cobalt napthanate.
Example I: Dabco 33LU (Triethylene diamine) supplied by Air Products.
Example II: T-12 (dibutyl tin dilurate) supplied by M & T Chemicals.
[(6)]Internal release agent - A tricarboxyl functional dimethyl polysiloxane:
$Me_3SiO(Me_2SiO)_A(MeSiO)_BSiMe_3$
         $|$
         $R$
where:
A = 50 to 100 repeating SiO units
B = to give 1-3 mole percent
R = a carboxy functional radical of 2 to 10 carbon atoms
The Examples use Q 27119 supplied by dow Corning
$Me_3SiO(Me_2SiO)_{95}(MeSiO)_3SiMe_3$ $HOOCCH_2S(CH_2)_2\ —\!|$

[(7)]Pure MDI adduct or prepolymer such as Isonate 143L and 181 from Upjohn and Mondur PF and CD from Mobay. P96 from Mobay is the isocyanate used in these Examples.

Example I is a three stream system. It is representative of polyurethane RIM processes described in U.S. Pat. Nos. 4,048,105 and 4,102,833.

Example II is a two stream system using a different extender/catalyst package and an acrylonitrile grafted polymer polyol as the base polyol.

Example III is a three stream system wherein the resulting plastic is referred to as a urea urethane because of the high concentration of primary amine extender.

The suppliers above referred are more completely identified as follows:

| | |
|---|---|
| Wyandotte: | BASF Wyandotte Corporation Wyandotte, Michigan 48192 |
| Union Carbide: | Union Carbide Corporation Chemicals and Plastics South Charleston, West Virginia 25303 |
| Jefferson: | Jefferson Chemical Company, Inc. 260 Madison Avenue New York, New York |
| Upjohn: | Upjohn Company Industrial Chemicals Division North Haven, Connecticut 06473 |
| Air Products: | Performance Chemicals Allentown, PA |

-continued

| | |
|---|---|
| Dow: | Dow Chemical Company<br>Freeport, Texas 77541 |
| Mobay: | Mobay Chemical Company<br>Division of Baychem Corp.<br>Pittsburgh, PA 15205 |
| Quaker Oats: | Quaker Oats<br>Chemical Division<br>Chicago, IL 60654 |
| M & T Chemicals: | M & T Chemicals, Inc.<br>Subsidiary of American Can Company<br>Rahway, New Jersey 07065 |
| Dow Corning: | Dow Corning Corporation<br>Midland, Michigan 48640 |

THE DRAWING

The drawing schematically illustrates the process of Example I.

In the drawing, the three separate streams, i.e. the polyol with siloxane (line 10), the polyol free of siloxane (line 11) and the prepolymer (line 12) are introduced into the mixing chamber of an injection molding machine 13. The ingredients are almost instantaneously mixed and injected into the mold cavity of mold 14. As indicated at 15, the mold has been prepared by polishing the mold surfaces and application of the siloxane thereto such that repetitious molding cycles can now be carried out without further mold preparation or cleaning. After a short cure time the molded article 16 is ejected from the mold.

With reference to Example I, the mixing and injection molding machine used is a standard one (a Mobay HC-1000) modified in house to meter the three streams. The pressure at the mix head is 2250 pounds per square inch and the time to injection in the mold is 2 seconds. Cycle time for injection to mold opening is 40 seconds. Total cycle time is 120 seconds.

The part made is a 1980 Chevrolet Monza front upper fascia.

An aluminum mold is used and the internal surfaces are prepared by:

(a) polishing with a rubbing compound (6065 supplied by E. I. duPont de Nemours & Co., Wilmington, Del.)

(b) wiping on CFS, the above-identified Q 2-7119, as supplied (c) buffing the surfaces dry (d) commencing molding until release failure occurs (e) repeating this sequence 9 times.

After this precondition or seasoning of the mold, more than 150 of the front fascia parts are made without need to clean or treat the internal mold surface or without increase in said release effort. The molding run is terminated voluntarily.

Example I illustrates a preferred embodiment of the invention wherein the ingredients for a polyurethane-forming composition are brought together and reacted in a mold cavity to form a molded article, with the ingredients including a normally liquid polycarboxy-functional alkyl siloxane internal mold release agent (hereinafter, "CFS"). This embodiment comprises:

I. dividing the ingredients into three components, viz:

(a) an isocyanate containing component free of the CFS and free of polyol;

(b) a polyol containing component free of the CFS and containing material that will react undesirably with the CFS, e.g. amine curing agent and/or organometallic catalyst, the amount of the curing agent and organometallic catalyst being sufficient to make the ingredients nonprocessable in the absence of the CFS; and, (c) a polyol-containing component containing the CFS and free of material that will react unduly with the CFS.

II. preconditioning the surfaces of the mold cavity contacting the ingredients by cleaning with a mild abrasive and uniformly and thinly applying CFS thereto and repeating several molding cycles with intermittent cleaning and reapplication of the CFS as required following which at least 100 molding cycles can be effected with good release and without further application of CFS to said surfaces, and III. maintaining the CFS present in the ingredients in a minimal amount which is sufficient to effect adequate release with the preconditioning and inadequate in the absence of the preconditioning.

Example II was used to manufacture a 1977 Chevrolet Monza front upper fascia with a modified Henneke RIM machine. The pressure at the mixhead was 2250 psi and the time to injection in the mold was 1.5 seconds. Cycle time for injection to mold opening was 40 seconds. The same type of aluminum mold was used and was prepared in the same manner as described for Example I. The example composition gave more than 30 consecutive releases. The run was stopped voluntarily.

The improvement in DOI afforded by the present internal release system is shown by the following top coated samples of white, blue metallic and dark maple metallic paints on molded plaques prepared according to Example I and according to the conventional procedure with a conventional wax mold release agent being spray applied each cycle, e.g. Release Agent 1477A, Contour Chemical Company, Woburn, Mass. The following results, averaged over several samples, were obtained:

| | DOI Readings | | | | |
|---|---|---|---|---|---|
| | Conventional Procedure | | Internal Release Procedure | | DOI |
| Top Coat Color* | Primer #1 | #2 | Primer #1 | #2 | Improvement |
| White | 59 | 59 | 85 | 85 | +26 |
| Blue Metallic | 8 | 5 | 26 | 10 | +8 avg. |
| Dark Maple Metallic | 49 | 54 | 70 | 71 | +19 avg. |

*DIO1 of PPG Industries, Inc. over two different primers. Primer #1 was 9 × 254C by Midland Division, Dexter Corp., Dividend Road, Rocky Hill, Connecticut 06067 and Primer #2 was 33152 by PPG Industries, Inc. 3800 W 143rd Street, Cleveland, Ohio 44111.

What is claimed is:

1. A process wherein the ingredients for a polyurethane-forming composition are brought together and reacted in a mold cavity to form a molded article, said ingredients including a polyol, an isocyanate and a normally liquid carboxy-functional siloxane internal mold release agent (hereinafter, "said CFS"), comprising:

I. dividing said ingredients into at least two components, viz:

(a) an isocyanate-containing component free of said CFS (b) a polyol-containing component containing said CFS and free of said isocyanate and free of material that will react undesirably with said CFS;

II. preconditioning the surfaces of said mold cavity contacting said ingredients by cleaning said surfaces and uniformly and thinly applying said CFS thereto, and repeating several molding cycles with intermittent cleaning and reapplication of CFS as required;

III. maintaining said CFS present in said ingredients in a minimal amount sufficient to effect adequate release with said preconditioning which minimal amount is inadequate to maintain continued release in the absence of preconditioning.

2. The process of claim 1 wherein said ingredients are divided into three components one of which includes portion of said polyol and a catalyst for the urethane reaction which component is free of said CFS and said isocyanate, and where said surfaces of said mold cavity are free of any externally applied mold release agent.

3. The process of claim 2 wherein said ingredients include the combination of an amine and an organometallic catalyst the amount of which catalyst is sufficient to render said polyurethane-forming composition inoperable in said process in the absence of said CFS.

4. The process of claim 3 wherein said process is a RIM process with said ingredients being rapidly brought together under pressure and mixed in less than 3 seconds in a mix head immediately contiguous to said mold cavity.

5. The process of claim 1 wherein to effect said preconditioning said surfaces are thoroughly cleaned each cleaning cycle with a mild abrasive and said CFS is applied thereto followed by buffing.

6. The process of claim 1 wherein less than 0.5 weight percent of said CFS is present in said ingredients based on the total weight of said ingredients and said CFS is a tricarboxy alkyl siloxane having sulfur linkages.

7. A polyurethane molding process comprising:

I. seasoning a mold cavity by applying to the surfaces thereof a carboxy functional siloxane mold release agent (hereafter "said CFS"), applying said CFS uniformly and thinly thereto with buffing and repeating of several molding cycles with intermittent cleaning of the mold surfaces and reapplication of said CFS directly to said surfaces;

II. for each molding cycle bringing the following polyurethane-forming streams together in a mix head under pressure with injection into said mold cavity in less than 3 seconds from the time of being brought together;
(a) a polyol-containing stream containing said CFS and free of isocyanate;
(b) a polyol-containing stream free of said CFS and containing an ingredient that will react with said CFS;
(c) an isocyanate-containing stream free of said CFS; and III. maintaining said CFS in said streams in a minimal amount of less than 0.3 weight percent based on total weight of said streams which minimal amount is insufficient in the absence of said seasoning to effect adequate release of the molded articles from said mold cavity over a series of at least 10 molding cycles.

8. The process of claim 7 wherein said (b) polyol-containing component contains an amine catalyst in approximately twice the amount that would be used in the absence of said CFS, and also contains an organo metal catalyst in approximately four times the amount that would be used in the absence of said CFS, and wherein said CFS is a tricarboxy functional dimethyl polysiloxane.

9. A process wherein the ingredients for a polyurethane-forming composition are brought together and reacted in a mold cavity to form a molded article, said ingredients including a normally liquid carboxy-functional alkyl siloxane internal mold release agent (hereinafter, "said CFS"), comprising:

I. dividing said ingredients into three components, viz:
(a) an isocyanate containing component free of said CFS and free of polyol;
(b) a polyol containing component free of said CFS and containing a tertiary amine catalyst, an organo-metallic catalyst and material that will react with said CFS, the amount of said tertiary amine catalyst and organo-metallic catalyst being sufficient to render said ingredients inoperable in said process in the absence of said CFS; and
(c) a polyol-containing component containing said CFS and free of material that will react with said CFS;

II. preconditioning the surfaces of said mold cavity contacting said ingredients by cleaning with a mild abrasive and uniformly and thinly applying said CFS thereto and repeating several molding cycles with intermittent cleaning and reapplication of said CFS as required following which at least 100 molding cycles can be effected with good release and without further application of said CFS to said surfaces; and III. maintaining said CFS present in said ingredients in a minimal amount which is sufficient to effect adequate release with said preconditioning and inadequate in the absence of said preconditioning.

10. The process of claim 1 wherein said process is a RIM process with said ingredients being rapidly brought together under pressure and mixed in less than 3 seconds in a chamber immediately contiguous to said mold cavity.

* * * * *